Aug. 13, 1940.   N. GARRETT   2,210,939
APPARATUS FOR USE IN SOLVING MATHEMATICAL PROBLEMS
Filed May 27, 1936   5 Sheets-Sheet 1

INVENTOR
Neal Garrett

INVENTOR
Neal Garrett

Aug. 13, 1940. N. GARRETT 2,210,939
APPARATUS FOR USE IN SOLVING MATHEMATICAL PROBLEMS
Filed May 27, 1936 5 Sheets-Sheet 4

INVENTOR
Neal Garrett

Aug. 13, 1940.                N. GARRETT                2,210,939
         APPARATUS FOR USE IN SOLVING MATHEMATICAL PROBLEMS
                    Filed May 27, 1936        5 Sheets-Sheet 5

INVENTOR.
Nea Garrett

Patented Aug. 13, 1940

2,210,939

UNITED STATES PATENT OFFICE 2,210,939

APPARATUS FOR USE IN SOLVING MATHEMATICAL PROBLEMS

Neal Garrett, Glendale, Calif.

Application May 27, 1936, Serial No. 81,990

26 Claims. (Cl. 33—98)

This application relates to some of the same subject matter of invention as applicant's copending application Serial No. 388,975, series of 1925, filed August 28, 1929, for Apparatus for solving mathematical problems. The apparatus described in this application embodies some of the same general features that have been shown and claimed in the copending application, and embodies many features that are different from those of the apparatuses shown in the copending application. The claims of this application that read on the disclosure of the copending application are to bear a relationship to the copending application like that which the claims of a divisional application bear to a parent application. The copending application was abandoned on April 3, 1939, and substantially the same subject matter of invention was embodied in application Serial No. 297,322, filed September 30, 1939.

This invention relates to apparatus for use in solving mathematical problems. This invention more especially relates to apparatus for use in solving algebraic equations that includes a plurality of devices each having a movable index element, and means adapted to transmit motion between the index elements of the several devices and to constrain the same so that the position of an index element on one of the devices will bear a given algebraic relationship to the positioning of the index elements on the other devices.

An object of my invention is to provide apparatus including suitable devices having movable index elements which can be conveniently set at postions representing respective numerical terms of an equation, such as the constant term and coefficients of respective powers of an unknown term of an equation, which apparatus is adapted to automatically indicate the value of the unknown on a suitable indicating device. A specific object of my invention is to provide an apparatus for solving equations of the general form $$a_0x^n + a_1x^{n-1} + a_2x^{n-2} + \ldots + a_{n-2}x^2 + a_{n-1}x + a_n = 0$$

wherein there are to be provided scales on which settings of indicating elements are to represent values of the "$a$" terms, a scale and indicating device for results, and means adapted to transmit motion between the indicating elements and to constrain the same so that the indicating element on the scale for indicating results will take a position representing a value of the unknown of an equation having "$a$" terms of values corresponding to the respective settings on the other scales.

A further object of this invention is to provide articles of manufacture in the form of parts, and combinations of parts, adapted to be put together and torn down as needed in providing adjustable devices for use in solving mathematical problems. It is a purpose of the invention to provide a relatively simple set of inexpensive members adapted to be assembled for a relatively constrained movement thereof for illustrating to a student many fundamental relations, proportions, and relative movements that give rise to many fundamental algebraic relationships. It is intended that such articles of manufacture together with methods of using the same will make possible the assembly of parts for providing a device that can be operated for the solution of an almost unlimited number of certain specific algebraic problems and that the assembly thereof will have a fascination comparable to that of using an "Erector" toy.

Figure 1:
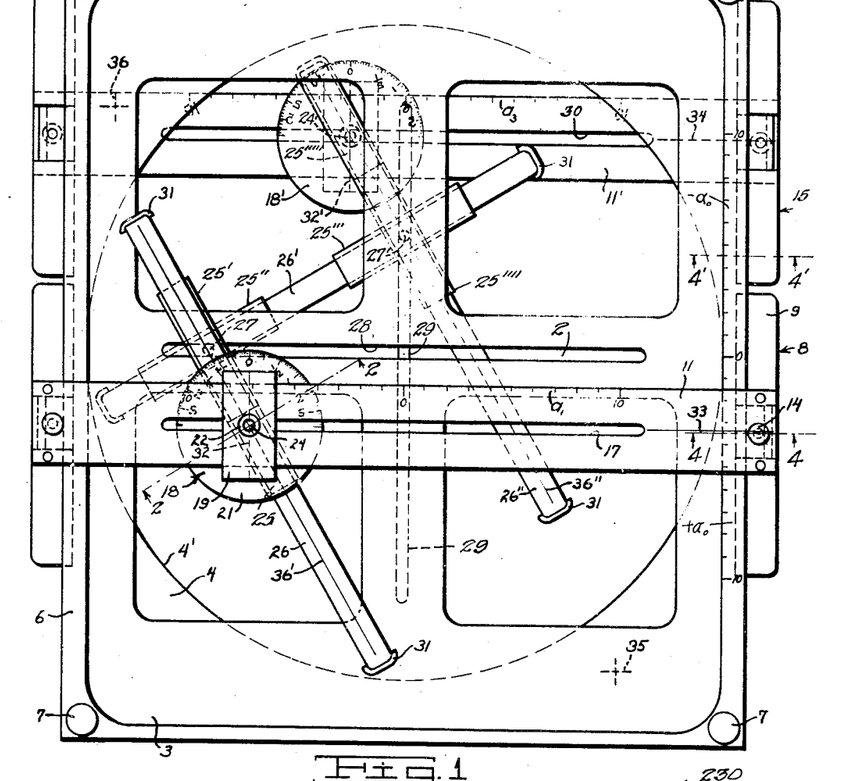
Fig. 1 is a plan view of an apparatus for solving third degree equations.
Figure 4:
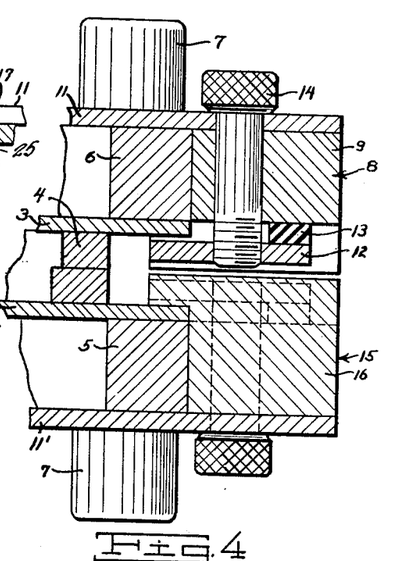
Fig. 4 is an enlarged sectional view taken on line 4—4 of Fig. 1, except for the lower half of the view which is taken on line 4'—4' of Fig. 1.

Referring to the drawings and specifically to Figs. 1 to 4, inclusive, a frame is comprised of bottom plate 2, upper plate 3, spreader 4, lower rim 5, and upper rim 6. Upper plate 3 is shown in Figure 1. Bottom plate 2 is the same size as upper plate 3 and is disposed in vertical alinement therewith. Figure 4 best illustrates the relative spacing of the parts of the frame. Legs 7 are attached to the rims where shown and are adapted to support the apparatus when placed either right-side up or up-side down on a supporting surface and to hold the device spaced from the surface so as to provide clearance for movements of parts of the device between the device and the surface. Spreader 4 is preferably of wood or a synthetic resin and is provided with a large round hole indicated by line 4' in Fig. 1 and is glued, cemented, or otherwise attached to plates 2 and 3. Plates 2 and 3 are preferably of some form of transparent material such as Celluloid or one of the newer forms of material made from synthetic resins. Rims 5 and 6 are of wood or any suitable material and are cemented or otherwise attached to plates 2 and 3 respectively. The plates and the rims project further from the side of the frame than does spreader 4 as is best shown in Fig. 4.

The sliding device 8 resembles a T-square in that it includes an arm 11 provided with a cross piece at one end and differs from the conventional T-square in that it is also provided with a crosspiece at the other end. Both ends of the sliding device are constructed substantially the same. Sliding device 8 is comprised of end pieces 9 slidably engaged with the underface and edges of upper plate 3 and with the edges and upper surfaces of rim 6; arm 11 attached to the upper surfaces of end pieces 9; and clamp elements each of which include a rectangular metal piece 12, a block of hard rubber 13, and a bolt 14. Device 8 can be fixed at an applied position by turning bolt 14 so as to draw piece 12 tightly against the underside of plate 3.

A similar sliding device 15 is provided on the other side of the apparatus. The end pieces 16 are similar in construction to the end pieces 9. The lower portion of Fig. 4 shows how the end pieces are engaged with the edge portions of the apparatus. Device 15 is provided with the same type of clamping elements as device 8.

The arm 11 is provided with a slot 17.

A sliding indicating device 18 is preferably made of a transparent material and is comprised of rectangular upper piece 19 cemented or otherwise attached to lower circular plate 21. Hollow set screw 22 extends through the indicating device and engages with a tapped metal piece 23, the latter of which is fixed with respect to plate 21. A tightening of set screw 22 causes the upper and lower portions of the device 18 to be tightly clamped with respect to the arm 11. A pin 24 extends through screw 22 and glide 25. Pin 24 provides a pivotal connection between device 18 and glide 25. Glide 25 is free to slide on member 26. Glide 25' is free to slide on the under side of member 26. The designs of the glides and the member on which they slide are so designed that the glides may slide past each other.

Glide 25' is rigidly attached to glide 25'' as by rivet 27. Glide 25'' is slidable on member 26'. Rivet 27 extends through and is slidable with respect to race 28 of plate 3 and by virtue of being rigidly fixed with respect to glides 25' and 25'' provides means for maintaining members 26 and 26' disposed at right angles relatively.

Glide 25''' is rigidly connected to glide 25'''' as by rivet 27'. Rivet 27' is rigidly fixed with respect to glides 25''' and 25'''' and provides, together with the latter, means for maintaining members 26' and 26'' disposed at right angles relatively, and, at the same time, provides the rivet 27' extending through and slidable with respect to he race 29 of plate 2. Glide 25''''' is slidable with respect to member 26''. Pin 24' provides pivotal connection between glide 25''''' and the indicating device 18'. The construction of the indicating device 18' and the sliding device 15 is similar to that of the indicating device 18 and sliding device 8. Members 26, 26', and 26'' are provided with combination stops and glides 31 which are to keep the respective glides entirely on the members and to engage with the inner surface of the rims in the case of members 26 and 26'', and with the circular inner edge of the spreader 4 in the case of member 26'.

The underside of the upper piece 19 of the indicating device 18 is provided with an index line 32. The upper surface of arm 11 is provided with a scale having the zero point of the scale at the center and preferably graduated in ten equal divisions and subdivisions thereof to each side of the center.

The underside of arm 11 is provided with an index line 33 which is in alignment with the center of race 17. The upper surface of rim 6 is provided with scales, the zero marking of which is in alignment with the center line of race 28. The under surface of rim 5 is provided with scales, (not shown), the graduations of which are in vertical alignment with respect to graduations on rim 6. All of the recti-linear scales of the apparatus illustrated by Fig. 1 are graduated to the same scale. Arm 11' of sliding device 15 is provided with an index line 34 in alignment with the center line of race 30 and is also provided with scales labeled $a_3$, the zero point of which is in vertical alignment with the center line of race 29.

The apparatus illustrated in Fig. 1 is adapted for use in solving algebraic equations of the general form $$a_0 x^3 + a_1 x^2 + a_2 x + a_3 = 0.$$

Such an equation is usually written in a form so that $a_0$ is a positive member.

To solve such an equation sliding device 8 is moved to a position so that the index line 33 crosses the scale labeled $+a_0$ at a position representing the value of $a_0$, whereupon the device 8 may be fixed in such position by tightening said screw 14. Indicating device 18 is moved to a position on the left-hand portion of the scale on arm 11 if $a_1$ is positive and to a position on the right-hand portion of the scale if $a_1$ is negative, more definitely the index line 32 of the indicating device is positioned so that the spacing thereof from the zero point of the scale on arm 11 is equal to the value of $a_1$ and set screw 22 is utilized to hold the indicating device in that position. The apparatus is then turned over so that the sliding device 15 is on top.

The dotted plus sign 35 shown in Fig. 1 will then be visible on the surface of plate 2. Let us assume that the apparatus has been turned over so that the side of the instrument containing the plus sign 35 will be in the upper right-hand corner of the instrument. A setting of index line 34 of device 15 on the side toward the plus sign 35 is made to represent positive values of $a_2$ and on the other side to represent negative values of $a_2$. The making of the setting representing $a_2$ is done in a manner similar to that described with respect to making a setting representing a value of $a_0$. Indicating device 18' is positioned so that index line 32' is positioned a distance from the zero point on the scale of arm 11' representing a value of a constant term for $a_3$, in a direction toward the plus sign 36 for positive values of $a_3$ and in the other direction for negative values of $a_3$. The circular scales of indicating devices 18 and 18' are graduated so that the tangent of the angle that the center indicating lines 36' and 36'', respectively, of members 26 and 26'' make, with the indicating lines 32 and 32', respectively, can be read. For any given set of coefficients and a constant term for which the device is set, the tangent of the angle as read on the indicating device will be one value of $x$ of the equation.

By especially manipulating the device and making the settings in other orders than that enumerated herein, a skilled operator can soon find ways of causing the relatively sliding parts of the device to automatically take positions so as to give one of the roots of the equation for each setting of the device and give a different root of the equation for each setting of the device until all of the roots are found.

Figure 1A:
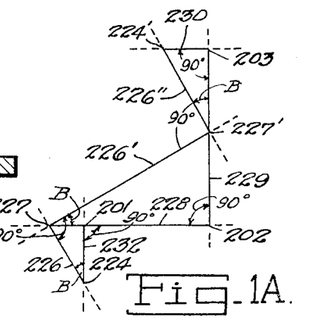
Figure 1A is a diagrammatic illustration of the essential parts of the apparatus of Figure 1 in certain positions.

Fig. 1A is a diagram in which lines are used to represent the positions of the essential parts of the apparatus shown in Fig. 1. Lines 226, 226', and 226'' represent the positions of the center lines of members 26, 26', and 26'', respectively. Line 232 represents the position of index line 32. Lines 228, 229, and 230 represent the positions of the center lines of races or slots 28, 29, and 30, respectively.

The portion of the indicating device 18 that provides the index line 32 and the portion of the plate 3 that provides the slot 28 may be considered as arms that respectively represent the legs of an adjustable right triangle. This triangle is illustrated in Fig. 1A as triangle 224, 201, 227. These arms are relatively directionally constrained for maintaining a right angular relationship between the same during any relative longitudinal displacement thereof by means comprised of the frame, the sliding device 8 and the indicating device 18 constructed as has been described. The portion of the plate 3 that provides the race 28 and the portion of the plate 2 that provides the race 29 may be considered to be arms for representing the legs of an adjustable triangular figure which is represented in Fig. 1A as triangle 227, 202, 227'. By the construction of the frame the portions that represents the legs of the last mentioned adjustable triangular figure are maintained at right angles to each other. The adjustable triangular figures just mentioned are connected by virtue of having the side of each thereof represented along the same arm, the position of which arm is represented by line 228 in Fig. 1A. These figures are also connected by the device that maintains a rigid right angular relationship between members 26 and 26' which device is comprised of glides 25' and 25'' rigidly connected by pin 27. This connection between the figures is adapted to maintain the same similar during adjustment thereof. If the relative spacing of line 32 and race 29 be maintained constant during an adjustment of the triangular figures to increase the length of the leg 227—202, an equal increase will automatically take place in the length of the leg 201—227. Because of the feature just mentioned the construction of the apparatus is such that, when this is done, a definite relationship is maintained between any relative longitudinal adjustment of the length of a leg of each of the triangular figures.

The portion of the apparatus that represents the legs of the triangle 227', 203, 224' may be considered as arms for representing the legs of that adjustable right triangular figure.

Figures 4A, 5:
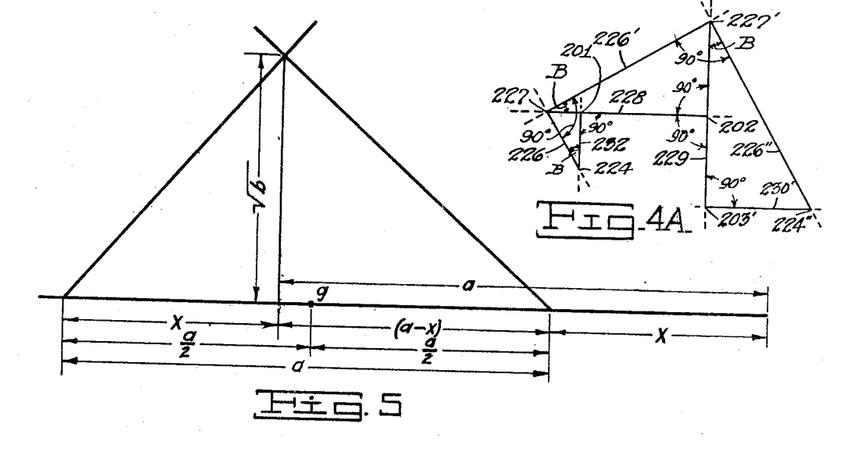
Figure 4A is a diagrammatic illustration of the essential parts of the apparatus of Figure 1 in certain positions.
Fig. 5 is a diagram illustrating a theory on which an apparatus embodying features of my invention is based.

Fig. 4A illustrates the relative positioning of the essential parts of the apparatus shown in Fig. 1 for a case in which the sliding device 15 and the indicating device 18' have been shifted into position to represent a positive quantity as $a_2$ and a minus quantity as $a_3$, respectively, while at the same time the rest of the parts of the apparatus have been left in the same position in which they are shown in Fig. 1. Fig. 4A is substantially the same as Fig. 1A except that the upper triangle of Fig. 1A is replaced by the triangle 227', 203, 224'' of Fig. 4A. In Fig. 4A the position of the center line of the race 30 is represented by the line 230'. The triangular figures are characterized by 90° angles. The angles designated by the reference character B must then be equal.

The distance 224—201 represents $a_0$. The distance 227—201 must then be equal to $a_0$ multiplied by the tangent of the angle B. The distance 201—202 represents $a_1$. The leg 227—202 must then be equal to $$a_0 \tan B + a_1$$

The leg 227—202 must then be equal to $$(a_0 \tan B + a_1) \tan B$$

The distance 202—203' represents $a_2$. The leg 227'—203' must then be equal to $$(a_0 \tan B + a_1) \tan B + a_2$$

The leg 203'—224'' must then be equal to $$[(a_0 \tan B + a_1) \tan B + a_2] \tan B$$

which must be equal to minus $a_3$ because the leg 203'—224'' represents minus $a_3$. Replacing the tangent of the angle B with $x$ this relation becomes $$[(a_0 x + a_1) x + a_2] x = -a_3$$

Multiplying and transposing we have $$a_0 x^3 + a_1 x^2 + a_2 x + a_3 = 0$$

which is the general form of an equation of the third degree. Therefore, the tangent of the angle B, as the same can be read from the indicating device 18, is a value of $x$ of the equation.

Replacing the tangent of B with $x$ in some of the foregoing and we have that:
Leg 224—201 represents $a_0$.
Leg 227—201 represents $a_0 x$.
Leg 227—202 represents $a_0 x + a_1$.
Leg 227'—202 represents $(a_0 x + a_1) x$.
Leg 227'—203' represents $(a_0 x + a_1) x + a_2$.
Leg 203'—224'' represents $$[(a_0 x + a_1) x + a_2] x$$ and also represents $-a_3$.

These six quantities may be hereinafter referred to as elements of a third degree equation. No matter what the relative situation of the indicating devices and sliding devices of the apparatus of Fig. 1 may be, the length of the legs will represent elements of a third degree equation. In other words a definite relationship is at all times automatically maintained between the parts that represent the legs of the triangular figures so that the length of said legs will always bear a relationship as do the aforementioned elements of an equation of the general form of the third degree.

As an example consider the equation $$3.4x^3+7.15x^2-9.7x+2.6=0$$

This equation may be solved by making the settings of the parts in the positions in which they are shown in Fig. 1. Sliding device 8 is fixed so that indicating line 33 crosses scale $a_0$ at a position to represent 3.4. Indicating device 18 is set so that index line 32 crosses scale $a_1$ at a position to the left of the zero marking of the scale to represent 7.15. Sliding device 15 is placed on the scale on the other side of the apparatus which is in direct alinement with the scale $a_0$ at a distance representing 9.7 and on the side away from the plus sign 35 because the value of $a_2$ is a minus quantity in this case. The indicating device 18' is positioned so that the indicating line 32' crosses the scale $a_3$ at a position to represent 2.6. This last setting is made on the side of the scale $a_3$ toward the plus sign 36 because $a_3$ is in this case positive. When such an apparatus is set as just described, the tangent of the angle between the indicating line 32 and the line 36, which can be read on the indicating device 18, will be approximately 0.577 which is one value of $x$ of the equation. Referring to Figures 1 and 1A, the apparatus is such that the side 202—227' of the second figure adds algebraically with the dimension 202—203 in establishing the length of the side 227'—203 of the third figure. The dimension 202—203 has the larger absolute value. It represents —9.7. The side 227'—203 must then represent a minus quantity. Then side 227'—203 multiplied by the tangent of B will then give a minus quantity as the length of side 203—224' which is correct as to sign because it is to represent minus $a_3$. This theory will be further discussed after the apparatus illustrated by Figures 13 and 14 has been described.

Figures 10, 11, 12:
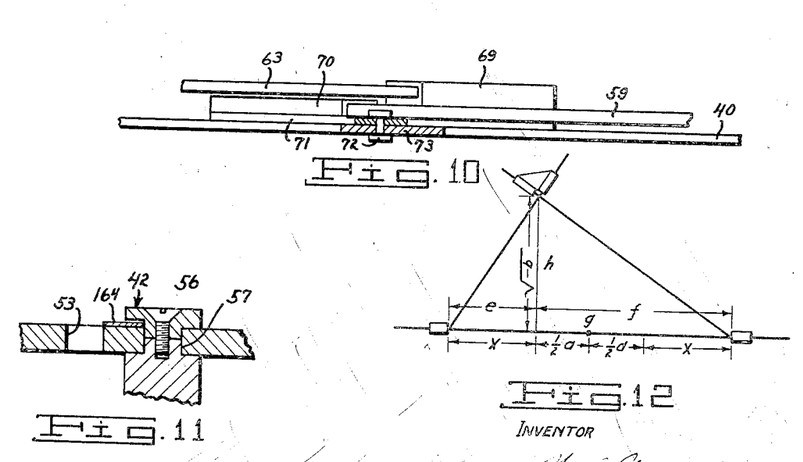
Fig. 10 is a fragmentary sectional view taken on line 10—10 of Fig. 8.
Fig. 11 is a fragmentary sectional view taken on line 11—11 of Fig. 6.
Fig. 12 is a diagram illustrating the theory on which the operation of the apparatus shown in Figs. 6-11, inclusive, is partially based.

In Fig. 12 the triangles are right triangles and $h$ is therefore perpendicular to the hypotenuse of the larger triangle. Under these conditions $$ef=h^2$$

The general form of an equation of the second degree is generally written $$a_0x^2+a_1x+a_2=0$$

Divide by $a_0$ to place the equation in the form, $$x^2+ax+b=0$$

Subtract $b$ from both sides of the equation and factor $x$ out of the remaining portion of the left-hand member to place the equation in the form $$x(x+a)=-b$$

which is an expression of a product of two terms equivalent to the just mentioned relationship $$ef=h^2$$

The distances $e$, $f$, and $h$ represent $x(x+a)$, and $\sqrt{-b}$, respectively. The dimensioning on Fig. 12 shows that point $g$ is in the center of the hypotenuse of the larger triangle. An equation having at least one real root but no positive root is preferably transposed by substituting $-x_1$ for $x$. Many new and interesting conceptions regarding imaginaries have been discovered by observing the relative positioning that the parts of the apparatus take or tend to take when an attempt is made to solve equations having imaginary roots. The apparatus is adapted to serve a useful purpose by being for use in studying the subject of imaginary roots.

For the present, this description relates to the solution of second degree equations having a real value for $\sqrt{-b}$ which is the case when $b$ is a minus quantity. For any such equation having at least one and positive root, if such a figure as that shown in Fig. 12, be constructed so that $h$ is equal to the square-root of $-b$ and the distance of the center $g$ of the hypotenuse of the larger triangle is spaced from the perpendicular $h$ a distance representing one-half $a$, the distance $e$ will be a value of one root of the equation and the distance $f$ will be a value of the other root of the equation, the respective distances being to the same scale.

Figure 6:
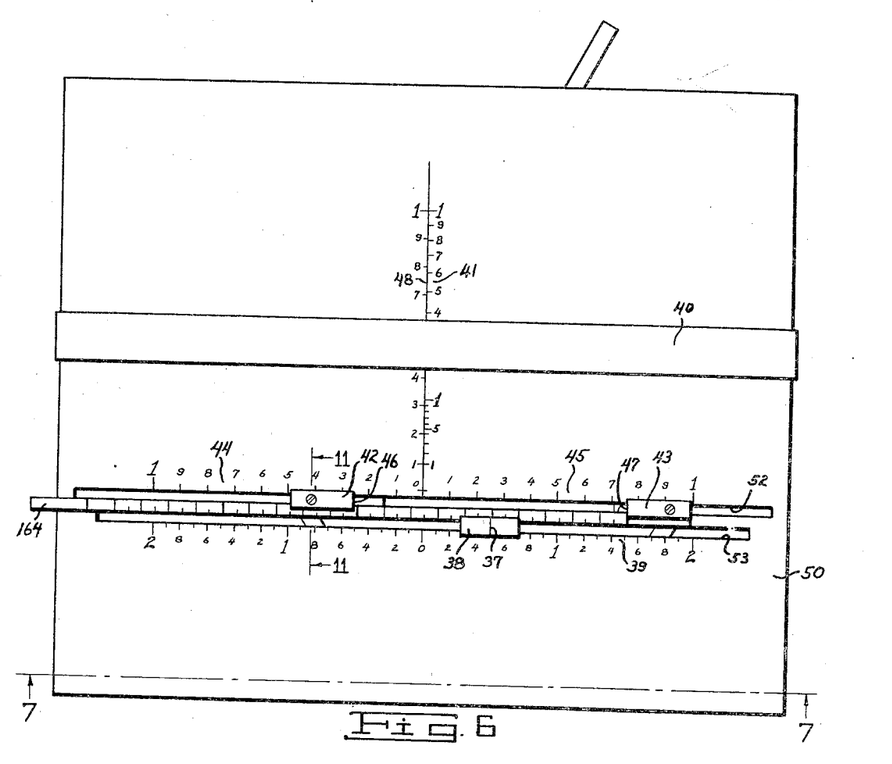
Fig. 6 is a plan view of an apparatus especially adapted for solving second degree equations.

On the apparatus shown in Fig. 6 index element 38 is placed at a position on scale 39 representing a value of the $a$ term of a second degree equation. The lower edge of the sliding index member 40 is placed on a graduation on scale 41 representing the absolute value of $b$ of the equation. When this is done the index elements 42 and 43 automatically take positions so that the index edges 46 and 47, respectively, take positions on scales 44 and 45 that represent the respective roots of the equation. The position of marker 37 is automatically maintained half-way between index edges 46 and 47, respectively. The graduations on scales 44 and 45 are twice as large as those on scale 39 so that the distance between the zero point and the marker 37 will be half the value of the setting representing $a$, said distance being here considered in terms of the scale to which scales 44 and 45 are graduated.

Scale 41 is preferably calibrated so that a distance from the zero point thereof to any graduation thereof is the square root of the value represented by the graduation as determined by the indicia of the scale. The linear scale 48 can be used instead of the scale 41 in making a setting of index member 40 corresponding to the square-root of $b$ on scale 48.

The apparatus as shown in Figures 6 to 11, inclusive, is assembled in a frame comprised of lower plate 49 and upper plate 50 held in spaced relation by spreaders 51. The upper plate 50 is provided with races 52 and 53 which are in the form of parallel rectilinear slots. Index elements 42 and 43 are in the form of traveler blocks adapted for rectilinear movement in race 52.

The elements 42 and 43 comprise body portions 54 and 54', respectively, and cap portions 55 and 55', respectively, which are respectively secured to body portions 54 and 54' by set screws 56 and 56'. The index elements 42 and 43 have longitudinally extending recesses 57 therein which engage the sides of the race 52. The body portion 54' of the index element 43 includes an inwardly directed projection 58 to which is pivotally secured, as by a screw 60, an arm 59.

The body portion 54 of the index element 42 also includes an inwardly directed projection 61 to which is pivotally connected, as by a screw 62, an arm 63. The index element 38 is mounted for rectilinear movement within the race 53. The index element 38 is constructed in a manner similar to the index elements 42 and 43 in the manner in which it slideably engages the edge of the race. The index element 38 is provided with a projection 64 adapted to support an axis in rectilinear alignment with pivotal connections provided by screws 60 and 62. The axis supported by projection 64 is provided by pin 65 which pivotally connects the center of lazy tongs 66 to projection 64.

Index member 40 is in the form of a rectangular band extending across the upper surface of the upper plate 50, engaging the edges of said plate and extending through the apparatus substantially midway between the upper and lower plates on a level sufficiently above the lazy tongs 66 to provide adequate clearance. The lower portion of index member 40 is provided with a projection 73 to which plate 71 is pivotally connected as by pin 72. The projection 73 maintains the pivotal connection in vertical alignment with the center line of the device, which center line is in alignment with the zero markings of scales 44, 45, and 39.

The pin 72 is supported at a spacing from the edge of the main portion of member 40 so that it may be brought into alignment with screws 60, 62, and 65 without bringing member 40 close enough to collide with index elements 42 and 43.

The scales 41 and 48 are positioned with their origin spaced a distance above the longitudinal axis of the race 52 a distance equal to the distance that the edge of member 40 is spaced from the axis of pin 72.

The arms 59 and 63 are offset as at 77 and 76, respectively, to allow the arms to swing to a position parallel to the longitudinal axis of the race 52.

Figure 7:
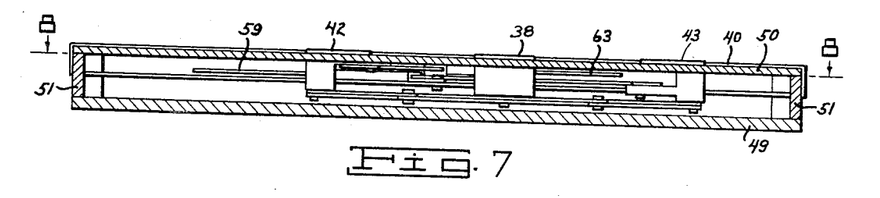
Fig. 7 is a sectional view taken on line 7—7 of Fig. 6.
Figure 8:
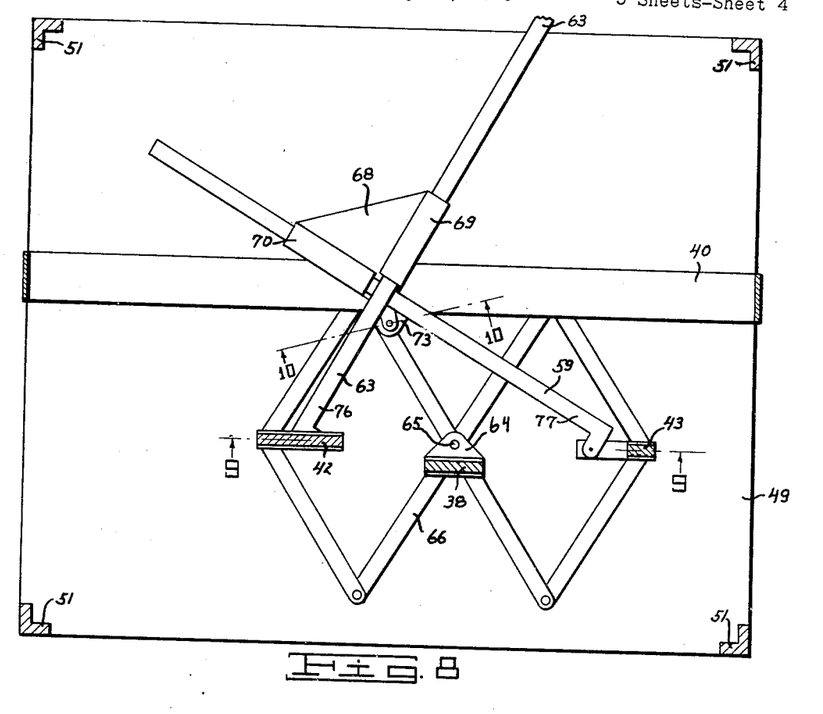
Fig. 8 is a sectional view of the apparatus shown in Fig. 6 taken on line 8—8 of Fig. 7.
Figure 9:
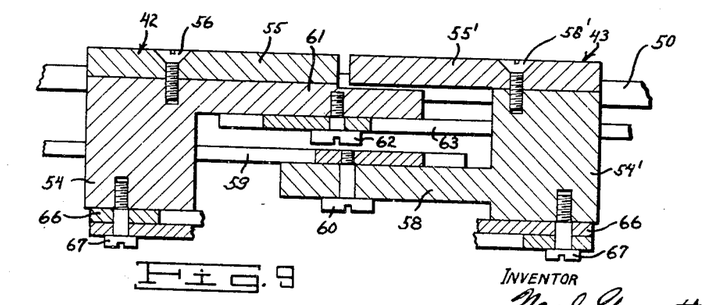
Fig. 9 illustrates the relationship of certain parts when moved in alinement with line 9—9 of Fig. 8 until disposed close together and is an enlarged fragmentary sectional view of parts thus disposed taken on line 9—9 of Fig. 8.

The lazy tongs 66, the band 40, the arms 59 and 63, and the brace 68 are so disposed as shown in Fig. 7 that their motions do not conflict. The projections 58 and 61 are disposed one above the other as shown in Fig. 9 so that the axis of their associated screws 60 and 62 may be brought into vertical alinement.

For equations having real values for the square root of $-b$, an operator need not make use of the indicia as shown in Fig. 6, but may select any number of the graduations on one of the linear scales as a unit of measurement and place one of the index edges as 46 at such number of graduations from the zero marking on scale 44 and at the same time hold index element 42 in such a position and move member 40 and index element 43 so that index element 43 is set for an absolute value of $b$ to the scale selected by the operator; then hold member 40 stationary and move elements 42 and 43 so that index element 37 is spaced from the zero marking a distance representing a value of one-half $a$ to the scale selected by the operator. The index elements 42 and 43 will then be spaced from the zero marking on scales 44 and 45 respectively, distance representing values of $x$ of the equation to the same scale selected by the operator.

Consider an equation when $a$ is positive and $b$ is negative. If the setting for $a$ be made to the right of the zero marking of scale 39, the reading taken on scale 44 will be the positive value of $x$ and the reading taken on scale 45 will be the negative value of $x$.

Consider the case when both $a$ and $b$ are minus quantities. If the setting of the absolute value of $a$ be made to the left of the zero marking on scale 39, the reading taken on scale 44 will be the negative value of $x$ and the reading taken on scale 45 will be the positive value of $x$.

In making and using apparatus for obtaining the real roots of second and third degree equations based on the theory described with reference to Fig. 12, the equation is preferably transposed to a form having a constant term of positive value as the right hand member if not already in such form. For example, consider a second degree equation having a minus quantity as the $a$ term and a positive quantity as the $b$ term. Arrange the terms in the form $$(-a-x)x=b$$

Since, in this case, the value of $a$ is a minus quantity, the product of $x$ and the difference between the absolute value of $a$ and $x$ is equal to $b$. The application of this relationship to a figure is as shown by the dimensions on Fig. 5. To facilitate the solution of equations by the method now being described, scale 164 is disposed parallel to race 52 and 53 and attached to one of index elements 42 and 43 and is slidable with respect to the other index element and with respect to plate 50 and index element 38. This scale has been shown attached to index element 43, and preferably provided with a suitable set of graduations to the same scales as scales 44 and 45 so that a distance corresponding to that between the axis of screws 60 and 62 can be determined by noting the position of index edge 46 with respect to said set of graduations. The distance noted will then correspond to the distance $a$ as dimensioned in Fig. 5. The scale 164 is preferably provided with a second set of suitable graduations to the same scale as scale 39 so that a distance, to the last mentioned scale, corresponding to that between the axis of pin 65 and screw 60, which is the same as the distance between the axis of screw 62 and pin 65, can be determined by noting the position of index edge 37 with respect to the second set of graduations on scale 164. This last mentioned distance corresponds to that which has been dimensioned as $$\frac{a}{2}$$

in Fig. 5. To solve an equation of the type now being discussed a setting of the member 40 is made to represent the square root of $b$, then the index elements are moved so that the position of index edge 46 with respect to the first mentioned set of graduations on scale 164 represents the value of $a$ or so that the position of index marker 37 along scale 164 represents the value of $a$ to the second mentioned set of graduations. Readings are then taken on scales 44 and 45 which readings, respectively, are the roots of the equation and they are both positive.

Figure 2:
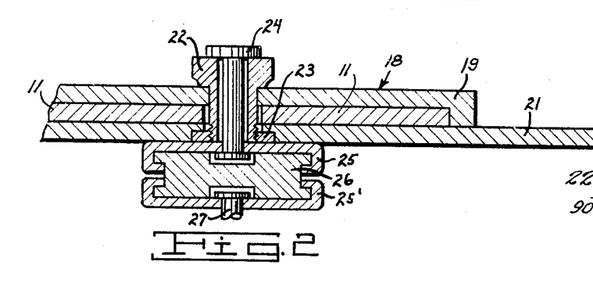
Figure 2 is an enlarged fragmentary sectional view taken on line 2—2 of Fig. 1.
Figure 3:
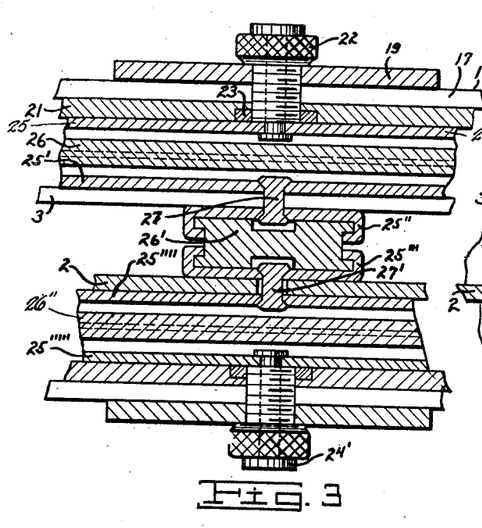
Fig. 3 is an enlarged fragmentary sectional view of the apparatus of Fig. 1 working parts thereof arranged in vertical alignment.
Figure 13:
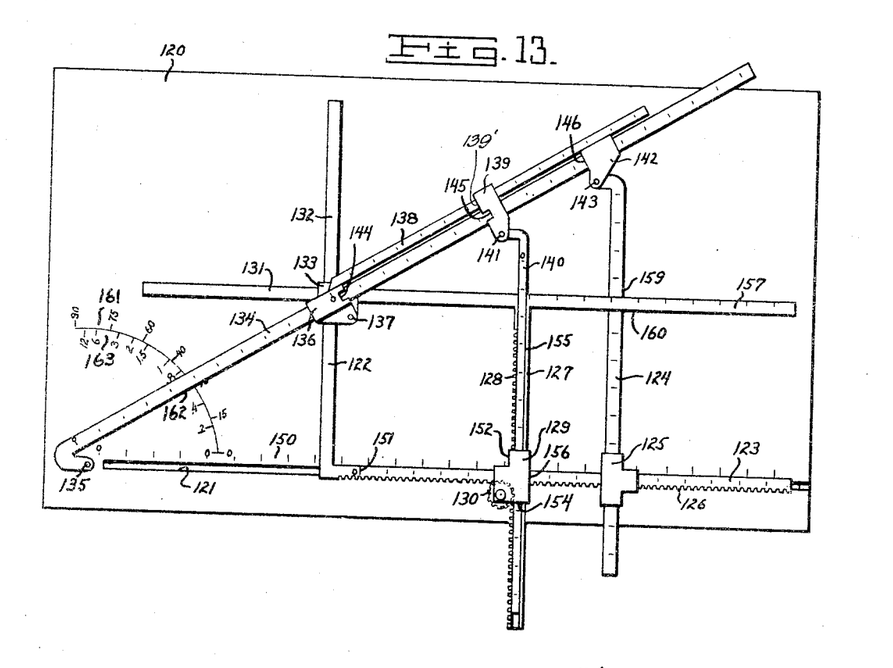
Fig. 13 is a plan view of an apparatus for use in solving many algebraic relationships.

The apparatus shown in Fig. 13 includes a thick plate 120 provided with a rectilinear groove 121. Rigid square 122 has one leg 123 thereof fitted with a portion thereof slidably engaged in the groove 121. Bar 124 and leg 123 are maintained at 90 degrees relative to each other by guideway-forming member 125. Bar 124 and leg 123 are slidable with respect to member 125. Leg 123 is provided with teeth 126. Rigid T-member 127 is provided with teeth 128 on the portion thereof extending at right angles to the leg 123, which portion of T-member 127 together with leg 123 are slidably connected and right-angularly disposed by member 129. Members 125 and 129 fit over suitably constructed edges of leg 123 in a manner similar to the way glide 25 fits over bar 26 as shown in Fig. 2. Member 129 supports a pinion 130 in engagement with teeth 126 and 128. Arm 131 of T-member 127 and arm 132 of square 122 are slidably and right-angularly disposed by connecting member 133. Arm 134 is pivotally connected to plate 120 as by pin 135. Arm 134 is provided with sliding index member 136. Member 136 is pivotally connected to member 133 as by pin 137. Sliding index member 136 is rigidly attached to scale 138. Sliding index member 139 is provided with ways through which arm 134 and scale 138 slidably extend. Index member 139 is pivotally connected to rod 140 as by pin 141. Index member 142 is slidably mounted on arm 134 and is pivotally connected to rod 124 as by pin 143. Pins 135, 137, 141, and 143 are maintained in rectilinear alignment and equal distant from arm 134 by the construction of the lower extremity of the arm 134, and the respective index members as shown in the drawing.

Figure 14:
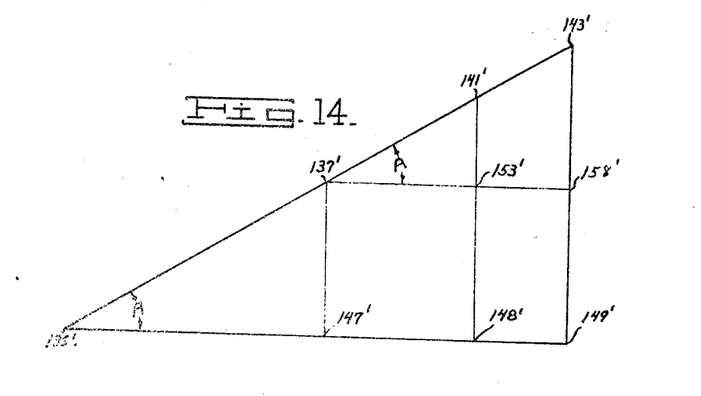
Fig. 14 is a diagram illustrating the theory on which the operation of the apparatus shown in Fig. 13 is based.

The theory on which the operation of the apparatus shown in Fig. 13 is based is illustrated by Fig. 14. Points 135', 137', 141', and 143' represent the positions of pins 135, 137, 141, and 143 respectively. Arm 134 is provided with suitable indicia so that the distance corresponding to that between points 135' and 137' is determined by the position of index edge 144 of member 133; between points 135' and 141' is determined by the position of index edge 145 of member 139; and between points 135' and 143' by the position of the indicating edge 146 of member 142. Scale 138 is provided with suitable graduations so that the distance between points 137' and 141' can be determined by the position of indicating edge 139', of member 139. Points 147', 148', and 149' are arranged in a straight line extending in a direction to represent that of the race 121 and are disposed in rectilinear alignment with point 135'. Plate 120 is provided with suitable graduations in the form of the scale 150 so that a distance representing that between points 135' and 147' can be determined by noting the position of index mark 151 of square 122 with respect to scale 150; and between points 135' and 148' can be determined by noting the position of indicating edge 152 of member 129 along scale 150. The teeth 128 of the vertical portion of the T-member 127 and teeth 126 of leg 123 are so engaged with the pinion 130 that a distance corresponding to that between points 148' and 153' is maintained the same as that between points 147' and 148'. Arm 140 is provided with graduations arranged so that the distance corresponding to that between points 148' and 153' can be determined by the position of indicating edge 154 of member 129 with respect to the graduations on arm 140 and so that the distance corresponding to that between points 153' and 141' can be determined by noting the position of mark 155 of T-member 127. Leg 123 is provided with suitable graduations so that the distance corresponding to that between points 147' and 148, which is the same as that between points 148' and 153', 153' and 137', and 137' and 147', can be determined by noting the position of index edge 156 of member 129 along the graduated leg 123. Arm 157 of T-member 127 is provided with suitable graduations so that a distance corresponding to that between points 153' and 158' can be determined by noting the position of index edge 159 of bar 124 with respect to the graduations on arm 157. Bar 124 is provided with suitable graduations so that a distance corresponding to that between points 158' and 143' can be determined by noting the position of index edge 160 along the graduations on bar 124.

Plate 120 is provided with scale 161 having suitable indicia so that the angular relationship corresponding to that between the rectilinear alignment of the points 135', 137', 141', and 143' and the rectilinear alignment of points 135', 147', 148', and 149' can be determined by noting the position of index edge 162 of arm 134 where the same crosses scale 161. Plate 120 is also provided with scale 163 adapted for use with indicating edge 162 in determining a tangent of the angular relationship just mentioned.

To solve an equation of the general form of the second degree by use of the apparatus described with reference to Figs. 13 and 14, set indicating mark 151 at a position along scale 150 to represent the value of $a_0$; next set bar 124 to provide indicating edge 159 thereof at a position along the graduation on arm 157 so as to represent the value of $a_1$ and at the same time adjust the apparatus so that the position of the indicating edge 160 of arm 157 with respect to the graduations on bar 124 will indicate the value of $-a_2$, $a_2$ being the constant term of the equation; and finally read the position of indicating edge 162 of arm 134 on scale 163. The reading thus obtained is a value of the tangent of the angle between arm 162 and groove 121 and is a value of $x$ of the equation. By the method just described any finite number of equations of the second degree can be solved on an apparatus as illustrated by Fig. 13 provided that $a_0$ and $a_1$ are positive and $a_2$ is negative. Equations having a different relationship between the signs of the coefficients can be solved by sliding some of the parts off of the respective arms and out of the race and reassembling the apparatus especially for handling such problems. For example, index member 142, bar 124, and member 125 may be provided at a position between arm 132 and bar 140, in which case the apparatus would be assembled for use in solving equations having negative coefficients as $a_1$.

When the apparatus is set as first described with reference to Fig. 13 for the solution of a second degree equation, the theory of the operation can best be described by considering the relationship of the parts as represented by corresponding portions of Fig. 14. The distance 135'—147' has been made equal to $a_0$. The distance 147'—137' must then be equal to $a_0$ multiplied by the tangent of angle A. This last dimension is transmitted by portions of the apparatus to an initial portion of the base of the upper right triangle which portion is the distance 137'—153', to which has been manually added the rest of the base of the upper triangle which is $a_1$ and is represented by the distance 153'—158'. The total length of the base of the upper triangle is then equal to $$a_0 \tan A + a_1$$

The apparatus has been set so that this length multiplied by the tangent of A must be equal to $-a_2$. Replacing the tangent of A with $x$ this relation becomes $$(a_0 x + a_1) x = -a_2$$

Multiplying and transposing, we have, $$a_0 x^2 + a_1 x + a_2 = 0$$

which is the general form of an equation of the second degree. Therefore, the reading taken of the tangent of A is a value of $x$ of the equation.

To use my method of constructing apparatus for solving equations of the $n$th degree and other complicated algebraic relationships, it is desirable to provide mechanism that is comprised of separate devices, each of which is a unit for maintaining such a relationship as is maintained by the portion of the apparatus described with reference to Figures 13 and 14 that establishes relative dimensions corresponding to the sides of the triangle 135'—147'—137' and the tangent of angle A; and to provide control means between the separate units for maintaining one of the relationships the same in each of the units; and to provide transmission mechanism for transmitting a dimension commensurate to that of one of the other relationships from one to the other of the devices.

The general equations of the first, second, third, and fourth degree may be stated, respectively, in the following form:

$$a_0x + a_n = 0 \quad (1)$$
$$(a_0x + a_1)x + a_n = 0 \quad (2)$$
$$[(a_0x + a_1)x + a_2]x + a_n = 0 \quad (3)$$
$$\{[(a_0x + a_1)x + a_2]x + a_3\}x + a_n = 0 \quad (4)$$

Any equation of the general form of the $n$th degree, which is $$a_0x^n + a_1x^{n-1} + a_2x^{n-2} + \ldots + a_{n-2}x^2 + a_{n-1}x + a_n = 0$$

may be converted to the style of those before listed by first factoring the portion of the equation to the left of the constant term, thus:

$$(a_0x^{n-1} + a_1x^{n-2} + a_2x^{n-3} + \ldots + a_{n-2}x + a_{n-1})x + a_n = 0 \quad (A)$$

next, factoring the portion to the left of the constant term in the parentheses, thus:

$$[(a_0x^{n-2} + a_1x^{n-3} + a_2x^{n-4} + \ldots + a_{n-2})x + a_{n-1}]x + a_n = 0 \quad (B)$$

then continuing this process by factoring the portion of the equation to the left of the constant term in the parentheses each time the equation is rewritten until the equation is written in a form such that merely $a_0x + a_1$ is left in the parentheses.

As illustrated by Figures 13 and 14, the theory now being described is applied for the second degree equation by providing two adjustable right triangular figures so that an angle between the hypotenuse of each thereof and an adjacent side is the same in each of the figures for any condition of adjustment of the other dimensions thereof. Such side of the first figure is made to represent $a_0$ and such side of the other figure is made to have the term $a_1$ used in establishing the length thereof. The other side of the first figure represents $a_0x$. Means is provided for transmitting a dimension equivalent to that of the last mentioned side of the first figure so as to add algebraically with the term $a_1$ in establishing the dimension of the aforementioned side of the second figure. This side of the last triangular figure which forms with the hypotenuse an angle whose tangent is $x$ is maintained to represent all that is to the left of the last "$x$" term in Equation 2. The other side of the last triangular figure represents all that is to the left of the "$a_n$" term. It also represents minus $a_n$.

An application of the theory for the third degree equation has been illustrated by Figures 1, 1A, and 4A. Compare Equations 2 and 3 and note that the build-up of both equations is somewhat the same, and that the larger equation merely builds up to one more degree than does the equation of the second degree. The theory now being described is applied for the third degree equation by merely extending that which has just been described so as to provide one more adjustable right triangular figure so that it will also have an angle between its hypotenuse and an adjacent side the same as those of the first and second triangular figures. Such side of the first figure is again made to represent $a_0$ and such sides of the other two figures are made to have the terms $a_1$ and $a_2$ respectively used in establishing the length thereof. As before the other side of the first figure represents $a_0x$ and the figures are so constructed that a dimension equivalent to that of the last mentioned side of the first figure is applied so as to add algebraically with the term $a_1$ in establishing the dimension of the aforementioned side of the second figure. The other side of the second figure represents $(a_0x + a_1)x$, which also is the case in the apparatus for the second degree equation. Thus far the build-up of the apparatus for handling either a second or a third degree equation is essentially as stated by the algebra in both Equations 2 and 3. To now continue for a third degree equation is but a continuation of the application of the same theory. The other side of the second figure represents $(a_0x + a_1)x$. The apparatus is so constructed that a dimension equivalent to that of the last mentioned side of the second figure is applied so as to add algebraically with the term $a_2$ in establishing the dimension of the aforementioned side of the third figure. Said side of the third figure is thus established as $$(a_0x + a_1)x + a_2$$

This side of the last triangular figure which forms with the hypotenuse an angle whose tangent is $x$ is thus maintained to represent all that is to the left of the last "$x$" term in Equation 3. The other side of the last triangular figure again represents all that is to the left of the "$a_n$" term and also represents $-a_n$.

The theory now being described may be applied for the case of the fourth degree equation by adding one more adjustable right triangular figure and making the apparatus so that the angle between the hypotenuse and one adjacent side of this triangular figure will be maintained the same as the corresponding angle of the first three triangular figures. The procedure is just as has been described for handling a third degree equation up to and including the establishment of the dimension of the side of the third triangular figure so as to represent $$(a_0x + a_1)x + a_2$$

The other side of the third figure represents $$[(a_0x + a_1)x + a_2]x$$

The apparatus is so constructed that a dimension equivalent to that of the last mentioned side of the third figure is applied so as to add algebraically with the term $a_3$ in establishing the dimension of the aforementioned side of the fourth figure. This side of the last figure must then represent all that is to the left of the last "$x$" term in Equation 4. The other side of the last figure will represent all that is to the left of the "$a_n$" term and will also represent $-a_n$.

The foregoing shows that the extension of the application of the theory now being described from that for the case of the third degree to that for the case of the fourth degree is analogous to the extension of the theory from that for the case of the second degree to that for the case of the third degree. Both extensions embody the addition of steps that are analogous to steps to be found in the build-up of the apparatus for the case of the second degree. An extension of the application of the theory now being described from that for the case of an equation of any given degree to that for the case of an equation of the next higher degree is made by adding steps that are analogous to those added in the extension of the application of the theory for the case of the second degree to that for the case of the third degree. By starting with an application of the theory for an equation of a low degree and extending the application thereof to the next higher degree, then again extending the application thereof to the next higher degree, and continuing this process, the theory now being described may be extended to apply to an equation of any given degree.

Consider a case in which the application of the theory has been applied for an equation of a high degree up to a point where the side of one of the right triangular figures, which forms with the hypotenuse an angle whose tangent is $x$, is established as all that portion of Equation B that is in the parentheses. The other side of that figure will represent all that is to the left of the "$a_{n-1}$" term in Equation B. The apparatus is so constructed that a dimension equivalent to that of the last mentioned side is applied so as to add algebraically with the "$a_{n-1}$" term in establishing the dimension of the side of the last triangular figure that forms with the hypotenuse an angle whose tangent is $x$. This side of the last figure must then represent all that is to the left of the last "$x$" term in Equation B. The other side of the last figure will then represent all that is to the left of the "$a_n$" term and will also represent $-a_n$.

For the application of the theory now being described to equations of high degrees principles of transmitting a dimension from one triangular figure to another triangular figure are of importance. With reference to Figures 21 and 22 description has been made of means for transmitting a dimension that represents the side 147'—137' of a first triangular figure to a portion of a second triangular figure so as to add with the dimension 153'—158' in establishing the length of the side 137'—158' of the second triangular figure. The theory now being described, and especially the variation thereof on which the apparatus of Figure 13 is based, will now be summarized by stating briefly the extended application of this theory for the case of an equation of the general form of the $n$th degree. Means is provided for maintaining a series of adjustable right triangular figures so that an angle between the hypotenuse of each thereof and an adjacent side is the same in each of the triangular figures. Means is provided for varying the length of such side of each of the triangular figures so that such side of the first thereof can be set to represent $a_0$ and so that such side of the rest thereof can be respectively set so as to add a successive one of the "$a$" terms thereto. Means is provided for transmitting the quantity $a_0 x$, which is represented by the other side of the first triangular figure so as to add algebraically with the term $a_1$ in increasing the dimension of one leg of the next triangular figure. In a similar manner means is provided for transmitting the quantity $(a_0 x + a_1) x$ to add algebraically with the dimension representing $a_2$ in the next triangular figure. Similar means is provided for transmitting dimensions representing the successive such quantities of the equation from one adjustable figure to the other until one of such sides, as first mentioned, of the last adjustable triangular figure is automatically maintained as the portion of the Equation A that is in the parentheses, whereupon the last figure is adjusted so that the other side thereof represents $-a_n$. The tangent of the angle between the hypotenuse and the side as first mentioned will then represent a value of $x$ of the equation.

The apparatus described with respect to Figures 1 to 4, inclusive, is a special case resulting from the application of the theory just set forth and the principles of the construction thereof are applicable to the construction of apparatus for handling equations of other degrees. The theory on which the operation of the apparatus described in Figs. 6 to 12 and with reference to Fig. 5 is a result of the application of the same theory as applied to the very specific and special case of the solution of the equation $$a_0 x^2 + a_2 = 0$$

The relationships set forth with reference to Figs. 12 and 5 were discovered by observing the relation between the elements of an adjustable figure when used in solving an equation of the type last above mentioned. This equation is but the special case of the second degree equation in which the "$a_1$" term is zero. For the application of the theory to this case consider the two right triangular figures represented in Fig. 12. The side $e$ of the first figure is made to represent $a_0$ and the other side $h$ represents $a_0 x$. The apparatus is so constructed that the dimension of this last mentioned side is applied to the second figure and, in this case, is actually the side of the second figure because there is no "$a_1$" term to add algebraically in establishing the dimension of that side. The other side of the second figure is made to represent $a_2$. The tangent of the angle between the hypotenuse of the first figure and the side $e$ will then represent a value of $x$ of the equation. The side $f$ is equal to $a_0 x^2$ as well as $-a_2$. Multiplying the quantities $a_0$ and $a_0 x^2$ which represent the sides $e$ and $f$, we obtain the product $a_0^2 x^2$ which is obviously the square of the quantity $a_0 x$ which represents the side $h$. Therefore, an application of the general theory to a special case places before an operator an embodiment of features as has been described with reference to Figures 5 to 12, inclusive, and such embodiment presents an actual machine having parts relatively movable and at the same time constrained so that, for any relative situation of the parts, the dimensions $e$, $f$, and $h$ always bear the relationship $$ef = h^2$$

This provides a primary introduction to the subject of arranging algebraic expressions in the form of a product of two terms placed equal to a third term and handling such expressions in some such manner as has been described with reference to Figures 5 to 12, inclusive. The theory has been extensively applied to the even simpler case in which the equation is divided by $a_0$ to place it in the form $x^2 + a = 0$. The application of the theory to this form reduces to merely a mechanism for extracting square root. The apparatus resembles that shown in Fig. 12. The dimension represented by $e$ is maintained as unity. The term $-a_2$, which is usually just a number which is to have its square root extracted, is represented by the side designated $f$. The reading taken that corresponds to the dimension $h$ is then the value of $x$ which is the desired square root of the number. It has been hereinbefore mentioned how the dimension may be set to represent the square root of $-b$ without the use of scale 40 or 41 and this is done by the theory just mentioned.

The application of the general theory to the case of an equation in the form of $x^2$ plus a constant placed equal to zero is of importance because any second degree equation may be handled in that way by first converting it to such a form. To do this, first divide by $a_0$ to place the equation in the form $$x^2 + ax + b = 0$$

then substitute $$x_1 - \frac{a}{2}$$

for $x$ to place in the form $$x_1^2 + \left(b - \frac{a^2}{4}\right) = 0$$

Each of the three species of apparatus herein described may be used for maintaining a relationship equivalent to the relationship, $$ef = h^2$$

which was first mentioned with respect to Fig. 12. This relationship may also be thought of as the special case of the general form of an equation which may be expressed in the form $$a_0 x^2 + a_2 = 0$$

If the apparatus shown in Figures 1 to 4, inclusive, be adjusted so that the settings for $a_1$ and $a_3$ are zero and settings be made for values of $a_0$ and $a_2$, arms 26 and 26' will serve as a square and races 28 and 29 will serve as the rest of the essentials of apparatus for representing the special case just mentioned. In the apparatus of Fig. 13 the rigid straight arm 134 has a function that corresponds to that of the equivalent of a square that is provided in the other species herein described and that is for maintaining a definite directional relationship between the hypotenuses of the two small right triangles. In the apparatus described with reference to Figures 13 and 14, the maintenance of one side of one of the smaller right triangles equal in length to one side of the other of the smaller right triangles is accomplished by the apparatus that has been described for maintaining the distances 137'—153' and 147'—137' equal. The apparatus of Fig. 13 is adapted to maintain a figure of the shape that the diagram of Fig. 12 would represent if the figure be cut on line $h$ and the right hand portion rotated 90° into a position to bring the hypotenuse of one of the smaller triangles in alinement with the hypotenuse of the other of the smaller triangles.

Many types of adjustable figures can be made so as to include triangular frames that are at all times similar and at the same time otherwise adjustable and so as to include mechanism for transmitting definite dimensional relationships between such frames. In the construction of such adjustable figures racks and pinions and/or special adaptations of the principles of constructing lazy tongs and other mechanisms may be made use of for maintaining a definite relationship between any relative longitudinal displacement of relatively directionally constrained arms.

A portion of the apparatus of Figure 1 is adapted for use in solving an equation of the form $$x^2 + ax + b = 0$$

If it be considered that the apparatus of Figure 1 is positioned so that the upper plate 3 is horizontal, an equation of this form may be solved by setting the arm 11 so that the position of the index line 33 on the scale designated $+a_0$ represents unity, setting indicating device 18 so that the position of index line 32 on the scale on arm 11 represents the given value of $a$, and otherwise adjusting the apparatus so that a point in vertical alinement with the center of rivet 27' is at a distance from race 28 that corresponds to a value of the given value of $b$, whereupon, the spacing of a point in vertical alinement with the center of rivet 27 from index line 32 will represent one value of $x$ of the equation and the spacing of the last mentioned point from race 29 will represent the other value of $x$ of the equation. It is sometimes convenient to set arm 11 at some other position and take the dimension represented by the relative spacing of races 28 and 17 as a unit of measure to which settings are made which represent the given values of $a$ and $b$. For the case where the arm 11 is set as shown in Figure 1, indicating device 18 is set so that the dimension between index line 32 and race 29 taken in the direction of race 28 represents a value of $a$, and the apparatus is otherwise adjusted so that a point in vertical alinement with the center of rivet 27 is at a dimension from race 28 that represents a value of $b$, whereupon, the dimension between a point in vertical alinement with rivet 27 and index line 32 represents a value of $x$ and the dimension between the last mentioned point and race 29 represents the other value of $x$ of the equation, said dimensions being to the scale of one unit is equal to the dimension that represents the distance between centers of races 17 and 28. The dimensions mentioned in this paragraph that represent the algebraic values of $a$ and $b$ are applied as to direction in accordance with the rules that have been set forth for the application of the corresponding terms, $a_1$ and $a_2$, respectively, of an equation of the general form.

Many short cuts are made in solving mathematical calculations by making use of a special feature of my invention wherein use is made of the relationship between the sides of a right triangle and the hypotenuse thereof as well as and together with the relationships made use of in solving problems in accordance with the theory hereinbefore mentioned. For this reason the apparatus shown in Fig. 13 has been provided with means for measuring the various segments of the hypotenuse of the right triangle. It is desirable for an operator to provide himself with a tabulation of algebraic expressions that represent the various distances that are measurable on the apparatus in terms of respective pairs thereof and combinations thereof. From such a tabulation an experienced operator will recognize relationships that are useful in solving simultaneous equations. For example, a pair of equations such as $$\frac{x^3}{x+y} = c_1$$

$$\sqrt{x^2 + y^2} = c_2$$

have left-hand members that can be recognized as the distance corresponding to 153'—141' and the hypotenuse 135'—141', respectively, expressed in terms of the sides 135'—148' and 148'—141', as $y$ and $x$, respectively. If $c_1$ and $c_2$ are constant numerical terms, the apparatus is adjusted so that indicating mark 155 will take a position along rod 140 that represents the value of $c_1$; and so that the index edge 145 will take a position along the graduations on arm 134 that represents the value of $c_2$. Then if the position of indicating edge 152 along scale 150 be noted and the position of index edge 154 along the graduations of bar 140 be noted, the readings thus obtained will be the values of $y$ and $x$, respectively.

Wherever necessary to make the meaning of any part of this application or of the appended claims definite, the words "figure" or "figures" are to be considered as referring to a tangible object or objects having shape and form such as the structure, frame, or assembly of tangible elements that represent a triangular figure.

A scale provided with graduations is not essential to every embodiment of my invention. It is only a refinement. In the case of a slide rule the scales are the essence of the device. As contrasted with this, without the use of refined scales, my apparatus can be assembled and set for giving a useful indication of a result of a problem to as useful a degree of accuracy as is sometimes necessary in engineering work. For example, consider a case where an operator is using the apparatus of Fig. 13 to solve a problem of the general form of the second degree. For some cases he may take as useful and sufficient indication of the value of the unknown the tangential property of the position of member 34 with respect to race 121 as it appears to him without using a scale and taking any measurements in standard units. In other words, he may just estimate a ratio which is the measure of the spacing of the elements that represent the side 147'—137' in units of the spacing of the elements that represent the side 135'—147'.

The word "scale" is to be considered as being broad enough to apply to any members for use in apparatus for solving algebraic problems where, in a use of the apparatus, a distance along one thereof is estimated in terms of a distance along another thereof, whether or not the members are provided with graduations. In other words, in addition to other meanings of the word "scale," a scale may be most anything for use in measuring or laying out or comparing distances such as a strip of wood or metal or other suitable material or a portion of a body adapted for use as a scale such as the portion of plate 120 that provides the race 121 shown in Fig. 13.

Wherever necessary to make the meaning of any part of this application or of the appended claims definite, the terms "rectilinear guideway," "rectilinear guide," "race," and "track" are to be considered as equivalent terms having the same meaning and the meaning of each of these terms is to be considered as being sufficiently broad to apply to any contrivance for serving to direct the motion of something in a straight line such as the portion of arm 11 that provides slot 17 shown in Fig. 1; the parallel edges of plate 30 which direct the motion of sliding index member 40 shown in Fig. 6; leg 123 which serves to direct the motion of members 125 and 129 shown in Fig. 13; and any portion of a surface of a body adapted to represent a straight line by being suitably engraved, painted or otherwise marked for serving to direct the motion of something in a straight line.

It is to be understood that the statement, "apparatus for use in solving algebraic equations of the form $$a_0x^n + a_1x^{n-1} + a_2x^{n-2} + \ldots + a_n = 0,"$$

is to apply to apparatus whose use may be limited to use in solving some group of equations of the general form of the third degree or some group of equations of the forms that would be obtained by substituting for $n$ any positive integers greater than two. Wherever reference is made to apparatus for use in solving algebraic equations of a certain form, such reference is not to be restricted in its application to apparatus for use in solving all equations of that certain form, but is to apply to apparatus for use in solving some algebraic equations of that certain form.

The absolute value of any one of the roots of an equation is considered to be a value of $x$ of the equation. The values of both roots of a second degree equation are considered to be the values of $x$ of the equation.

The foregoing is to be considered as illustrative of, rather than limitative upon, the scope of the meaning of the terms used in the appended claims.

While preferred forms of the invention have been described, it is to be understood that the drawings and the description thereof are to be considered as illustrative of, rather than limitative upon, the broader claims, because it will be apparent to those skilled in the art that changes in apparatus may be made without departing from the scope of the invention and that apparatus for constructing many types of mathematical problems may be made in accordance with the methods set forth in this application and in my copending application without departing from the scope of my invention.

I claim:

1. In apparatus for use in solving algebraic equations of the form $$a_0x^3 + a_1x^2 + a_2x + a_3 = 0$$

an indicating device having an indicating element mounted for movement for indicating results; a scale means including an index device mounted for movement, a setting of which index device represents a value of $a_0$; a second scale means having mounted for movement an index device, a setting of which represents a value of $a_1$; a third scale means having mounted for movement an index device whose position thereon represents a value of $a_2$; a fourth scale means including an index device mounted for movement, a setting of which last mentioned index device represents a value of $a_3$; and means for transmitting motion between the aforementioned index devices and the indicating element of the indicating device and for constraining the motion of the index devices with respect to each other and with respect to said element so that the indicating element on the indicating device will automatically take a position representing the value of $x$ of an equation having as the "$a$" terms thereof the respective values for which the respective index devices are set.

2. In apparatus for use in solving algebraic equations of the form $$x^2 + ax + b = 0$$

a rectilinear scale, an index device whose position along the scale represents a value of the $a$ term of the equation, said index device being mounted for movement longitudinally with respect to the aforementioned scale; a second rectilinear scale, a second index device whose position along said second scale represents a value of the $\sqrt{b}$, said second index device being mounted for movement longitudinally with respect to said second rectilinear scale; result scales having mounted for movement thereon indicating elements whose positions therealong represent values of the unknown of the equation, and means for transmitting motion between said index devices and said indicating elements and for constraining the relative movement of said devices and said elements so that the positions of the indicating elements on the respective result scales will be in positions corresponding to the values of $x$ of an equation having as the $a$ and $b$ term thereof the respective values for which the respective index devices are set.

3. An adjustable figure of the class described comprising scales for representing the base, the altitude, and the hypotenuse of any of a series of right triangles having dimensions within predetermined limits; an index member slidably engaged with respect to the one of said scales that is for representing the hypotenuse of any of the right triangles of the aforementioned series, said index member being for dividing the hypotenuse in two segments and scale members adapted to represent the sides of two triangles similar to the one of the triangles represented by the first mentioned scales and having the segments of the hypotenuse as the respective hypotenuses thereof and means for constraining the relative movements of the scales and index member so that one side of one of said two triangles will always be maintained equal to the length of the perpendicularly related side of the other of said two triangles.

4. In apparatus for use in solving mathematical problems a pair of relatively fixed perpendicularly related scales, index members slidable on the respective scales whose respective positions on the scales each represent a value of a power of a term of an algebraic problem of a form having just one other term, a rectilinear arm extending between the index elements having pivotal connection with one thereof, and means connected with said arm for determining the position of the index elements for any values of said one other term of the problem within predetermined limits, said means including a slidable and pivotal connection between the other one of the index elements and said arm.

5. In apparatus for use in solving algebraic problems, a pair of relatively movable arms, each supporting a rectilinear scale at right angles with respect to the rectilinear scale supported by the other thereof and means for constraining the relative movement of the arms so that a movement of one of the scales in a direction perpendicular to said one of the scales is the same as the movement of the other of the scales in a direction perpendicular to the latter, a slidable connecting member engaged with both of said scales substantially at the intersection thereof, a hypotenuse-forming scale means having a pivotal connection with said member and being adapted to swing about said pivotal connection with said member; means for representing a leg of any of a series of right triangles having the other leg thereof represented by a portion of one of said scales and the hypotenuse thereof represented by a portion of said hypotenuse-forming means, and means for representing a leg of any of a series of right triangles having the other leg thereof represented by a portion of the other one of said scales and the hypotenuse thereof represented by a portion of said hypotenuse-forming means.

6. In apparatus for use in solving algebraic equations, a pair of right-angularly disposed arms; a rectilinear guideway; a pivotal connection between the arms and the rectilinear guideway, said pivotal connection being located with respect to the arms substantially at the juncture of the arms, and said connection being slidable with respect to the guideway; a race disposed at right angles to the guideway; and means for determining the position along the race where each of the arms intersects the race.

7. In apparatus for use in solving mathematical problems, arms for representing the legs of adjustable right-triangular figures, means for relatively directionally constraining said arms for maintaining a right-angular relationship between the arms that represent the legs of each of said figures during any relative longitudinal displacement of the arms, connection between the figures for maintaining the same similar during adjustment thereof, and means for maintaining a definite relationship between any longitudinal displacement of one of said arms with respect to a relative longitudinal displacement of another of said arms that represents a leg of a different one of said figures than that which has a leg thereof represented by said one of said arms.

8. Apparatus for use in solving algebraic equations of the form $$a_0 x^3 + a_1 x^2 + a_2 x + a_3 = 0$$

comprising a base having two parallel and relatively fixed scales thereon for having represented therealong values of $a_0$ and $a_2$, respectively, said scales having zero graduations in alinement, said base having a first rectilinear guideway parallel to the aforementioned scales and a second rectilinear guideway parallel to the first rectilinear guideway, said base having a first race at right angles to said scales and in alinement with the zero graduation thereof and a second race parallel to said scales; a sliding device adapted for translation along the first rectilinear guideway and being provided with an index line at right angles to the scale for representing $a_0$, the position of which index line along the last mentioned scale represents $a_0$, said sliding device being provided with a rectilinear guideway parallel to the index line and being provided with a rectilinear scale for measuring distances along the last mentioned guideway for representing values of $a_1$, the last mentioned scale having its zero graduation in alinement with the second race; an indicating device adapted for translation along the guideway of the sliding device, said indicating device being provided with an index line at right angles to the index line of the sliding device, the position of which index line along the last mentioned scale represents values of $a_1$, said indicating device having a perpendicular axis at the intersection of lines through the aforementioned index lines, said indicating device having a tangent scale graduated for indicating the tangents of angles having one side thereof coincident with the index line of the indicating device and the vertex thereof at said axis; a rectilinear member having slidable and pivotal connection with respect to said indicating device at said axis, said member being provided with an indicating line parallel to the member and extending through said axis, said indicating line being for indicating the value of $x$ on said tangent scale; a second member; a slidable connection between the first and second members adapted to maintain the second member at right angles to the first member, the last mentioned slidable connection being connected with the first race for movement along the race; a third member; a slidable connection between the second and third members adapted to maintain the third member at right angles to the second member, the last mentioned slidable connection being connected with the second race for movement therealong; a second sliding device adapted for translation along the second rectilinear guideway and being provided with an index line at right angles to the scale for representing values of $a_2$, the position of which index line along the last mentioned scale represents values of $a_2$, said second sliding device being provided with a rectilinear guideway parallel to the last mentioned index line and being provided with a rectilinear scale for measuring distances along the last mentioned guideway for representing values of $a_3$, the last mentioned scale having its zero graduation in alinement with the second race; another indicating device adapted for movement along the last mentioned guideway, the position of which indicating device along the last mentioned scale represents values of $a_3$; and a pivotal and slidable connection between said second indicating device and the third member, said connection being situated in alinement with the last mentioned index line.

9. Apparatus for use in solving algebraic equations of the form $$x^2 + ax + b = 0$$

comprising a base having a rectilinear guideway and a race at right angles to the guideway, said base having a scale for representing dimensions from the race in a direction perpendicular to the race that represent values of the square root of the absolute value of the "$b$" term of the equation; a sliding index member adapted for translation on the guideway whose position along the aforementioned scale represents the square root of the absolute value of the "$b$" term of the equation; two rectilinear arms; slidable and pivotal connection between the arms and the sliding index member, said connection being adapted to maintain the arms at right angles to each other; scales along the race having a zero marking thereof in perpendicular alinement with the axis of the aforementioned pivotal connection, said scales being for representing distances each way from said zero graduation; two index elements adapted for movement along the race; pivotal connection between one of the indicating elements and one of the arms adapted for holding the index element at a distance from said zero graduation to represent the length of a leg of a right triangle whose hypotenuse is through the aforementioned axis and parallel to the arm; another pivotal connection between the other arm and the other index element adapted to hold the index element at a distance from said zero graduation to represent the length of a leg of a right triangle whose hypotenuse is parallel to the last mentioned arm and passes through the aforementioned axis; another index element adapted for movement parallel to the last mentioned scales; and means for automatically maintaining the last mentioned index element at a position halfway between the other two index elements.

10. In apparatus for use in solving algebraic problems, elements relatively fixed in direction at right angles with respect to each other for representing the sides of two adjustable right triangular figures and means for representing the hypotenuse of each of said figures, said means having the portion thereof for representing the hypotenuse of one of said figures fixed in direction at an integer multiple of ninety degrees with respect to the portion thereof for representing the hypotenuse of the other of said figures during adjustment of the size and shape of said triangular figures.

11. In apparatus for use in solving algebraic equations, two adjustable right-triangular structures for representing any of a series of pairs of right triangles; said structures including hypotenuse-representing means for representing the hypotenuse of each of the triangles of each pair of triangles of said series, elements relatively fixed in direction at right angles with respect to each other for representing the legs of the triangles of said series, said means being adapted for functioning together with said elements for maintaining the sum of the angle between the hypotenuse and one leg of one of the triangles and the angle between the hypotenuse and one leg of the other of the triangles equal to a right angle during adjustment of the triangular structures by having the portion of said means for representing the hypotenuse of one of the triangles fixed in direction at an integer multiple of ninety degrees with respect to the portion thereof for representing the hypotenuse of the other of the triangles of each pair of triangles of said series, said elements and said means being adapted for maintaining said one leg of one of the triangles the same length as said one leg of the other of the triangles, whereby a variable side of one of the triangular structures is maintained the same length as that of a side opposite a corresponding similar side of the other triangular structure during adjustment of the structures.

12. In apparatus for use in solving algebraic equations, two adjustable right-triangular figures including elements for representing the legs of said figures and means for representing the hypotenuse of each of said figures and for maintaining a definite directional relationship between the portion thereof for representing the hypotenuse of one of said figures and the portion thereof for representing the hypotenuse of the other of said figures for functioning together with said elements for maintaining the sum of the angle between the hypotenuse and one leg of one of said figures and the angle between the hypotenuse and one leg of the other of said figures equal to a right angle during adjustment of the size and shape of said figures, and said figures having a variable side of one of said figures the same length as that of a side opposite a corresponding similar side of the other one of said figures for all positions of adjustment of said means with respect to said elements.

13. In apparatus for use in solving algebraic equations of the form $$a_0 x^3 + a_1 x^2 + a_2 x + a_3 = 0$$

an indicating device including a mounting having a relatively fixed element and an indicating element mounted for movement with respect to said mounting, the position of which indicating element with respect to the fixed element represents a value of $x$ of the equation; a scale means including a mounting having a relatively fixed element and a member mounted for movement with respect to the last mentioned mounting, the position of which member with respect to the last mentioned element represents a value of $a_0$; a second scale means including a mounting having a relatively fixed element and a member mounted for movement with respect to the last mentioned mounting, the position of which last mentioned member with respect to the last mentioned element represents a value of $a_1$; a third scale means including a mounting having a relatively fixed element and a member mounted for movement with respect to the last mentioned mounting, the position of which last mentioned member with respect to the last mentioned element represents a value of $a_2$; a fourth scale means including a mounting having a relatively fixed element and a member mounted for movement with respect to the last mentioned mounting, the position of which last mentioned member with respect to the last mentioned element represents a value of $a_3$; each of said scale means having the member of each thereof adapted to be set at selected positions with respect to the fixed element of the mounting thereof; and means for determining the position of the indicating element with respect to the hereinbefore first mentioned fixed element for any values of the "$a$" terms, within predetermined limits, for which the relative positions of the aforementioned members of the respective scale means are set with respect to the fixed elements of the respective scale means.

14. In apparatus for use in solving algebraic problems, a base having a straight race; a device mounted with respect to the base for rectilinear movement in a direction perpendicular to the race; a pair of rectilinear members relatively fixed in direction to represent a right angle; pivotal connection between said members and said device, said pivotal connection being substantially at the apex of said right angle and said members being adapted to swing about said pivotal connection and to intersect said race so that the distance between said connection and the intersection of one of said members with the race measured in the direction of the race, the distance between said connection and the intersection of the other one of said members with the race measured in the direction of the race, and the distance between said connection and the race will bear the relation of the terms $e$, $f$, and $h$, respectively in the relation $$ef = h^2$$

as and for the purpose set forth.

15. In apparatus for use in solving algebraic problems an adjustable rectangular frame comprising two pairs of scales having the scales of each pair disposed rigidly at right angles with respect to each other and having each scale of one pair intersecting a scale of the other pair and having one pair movable with respect to the other pair, and means for maintaining the intersecting scales perpendicular with respect to each other during relative movement of the pairs of scales; and a hypotenuse forming means for representing the hypotenuse of any of a series of triangles having a corner of said frame substantially along the hypotenuse and the legs thereof substantially in alinement with the ones of the aforementioned scales that are respectively spaced the length and the breadth of said frame from the aforementioned corner.

16. In apparatus for use in solving mathematical problems, mounting disposed ninety degrees relatively; a linear rod; devices linearly movable on each mounting and formed to receive said rod to secure relative alinement of the devices during movement of the devices linearly; a pair of linear rods disposed at right angles to the first said rod and connected with the respective devices so that, when either of the rods of the aforementioned pair of rods is moved to place a portion thereof at a selected position with respect to the mountings while a portion of the other of the rods is held at a selected position with respect to the mountings, said devices will take a definite position of angular relationship with respect to the mountings and the relative angular position of one of the rods with respect to one of the mountings will be an indication of said angular relationship.

17. In apparatus for use in solving algebraic equations of degree higher than one, a plurality of relatively fixed rectilinear elements disposed at ninety degrees relatively for having terms of an equation dimensionally represented therealong; a movable member intersecting each of said elements, and means for constraining the movement of the movable member so that each of the dimensions between a predetermined point on each of said elements and the intersection of the same with the movable member represents a value of a respective term of the equation for any position (within predetermined limits) of the movable member with respect to the fixed elements.

18. In apparatus for use in solving algebraic equations, two adjustable triangular structures for representing any of a series of pairs of right triangles, hypotenuse-representing means for representing the hypotenuse of each of the triangles of each pair of triangles of said series, elements for representing the legs of the triangles of said series, connecting means for functioning together with the hypotenuse-representing means and the elements for representing one leg of each of the triangles for maintaining the sum of the angle between the hypotenuse and said one leg of one of the triangles and the angle between the hypotenuse and said one leg of the other triangle equal to a right angle during an adjustment of the triangular structures.

19. In apparatus for use in solving algebraic equations, adjustable structure including elements adapted to represent directions and dimensions of the sides and hypotenuse of any of a series of pairs of right-triangular figures, means for transmitting motion from one triangular figure to the other for maintaining the triangles similar during adjustment of some of the elements that represent the dimensions of the figures and means for indicating the position of some of the elements relative to other of the elements.

20. In apparatus for use in solving algebraic equations, relatively fixed, rectilinear guideways for a plurality of movable devices, movable devices engaged with the respective guideways, alining means for simultaneously moving said devices in accordance with a predetermined relation of movement and means to determine the position of certain parts relative to other parts.

21. In apparatus for use in solving algebraic equations of the form $$a_0 x^2 + a_1 x + a_2 = 0$$

an indicating device including a mounting having a relatively fixed element and an indicating element mounted for movement with respect to said mounting, the position of which indicating element with respect to the fixed element represents a value of $x$ of the equation; three several scale means being assigned to the terms $a_0$, $a_1$ and $a_2$, respectively, each of said scale means including a mounting having a relatively fixed element and a member mounted for movement with respect thereto, the position of which member with respect to the fixed element of the mounting of the scale means represents a value of the "$a$" term of the equation to which the scale means is assigned, each of said scale means having the member of each thereof adapted to be set at selected positions with respect to the fixed element of the mounting element; and means for determining the position of the indicating element with respect to the hereinbefore first mentioned fixed element for any values of the "$a$" terms, within predetermined limits, for which the relative positions of the aforementioned members of the respective scale means are set with respect to the respective fixed elements of the respective scale means.

22. In apparatus for use in solving algebraic equations of the form $$a_0x^n+a_1x^{n-1}+a_2x^{n-2}+ \ldots +a_n=0$$

an indicating device including a mounting having a relatively fixed element and an indicating element mounted for movement with respect to said mounting, the position of which indicating element with respect to the fixed element represents a value of $x$ of the equation; $n+1$ several scale means being assigned to the terms $a_0$, $a_1$, $a_2$, ..., $a_n$, respectively, each of said scale means including a mounting having a relatively fixed element and a member mounted for movement with respect thereto, the position of which member with respect to the fixed element of the mounting of the scale means represents a value of the "$a$" term of the equation to which the scale means is assigned, each of said scale means having the member of each thereof adapted to be set at selected positions with respect to the fixed element of the mounting thereof; and means for determining the position of the indicating element with respect to the hereinbefore first mentioned fixed element for any values of the "$a$" terms, within predetermined limits, for which the relative positions of the aforementioned members of the respective scale means are set with respect to the respective fixed elements of the respective scale means.

23. In apparatus for use in solving algebraic equations of the form $$a_0x^2+a_1x+a_2=0$$

a fixed element; relatively movable elements for use in setting dimensions for representing any given values of the "$a$" terms within predetermined limits, dimensions of the relative positions of the fixed element and the relatively movable elements being assigned to the "$a$" terms; and means for so controlling the relative positioning of the fixed element and the relatively movable elements for all values of the "$a$" terms within predetermined limits, that the position of one of the relatively movable elements with reference to the fixed element denotes an inverse trigonometric function of $x$ of the equation.

24. In apparatus for use in solving algebraic equations of the form $$a_0x^2+a_1x+a_2=0$$

a fixed element; relatively movable members adapted to be set at selected positions with respect to the fixed element, the relative positions of the fixed element and the members having dimensions that represent the "$a$" terms of an equation of the aforementioned form for any set of the selected positions at which the members may be set with respect to the fixed element; and means for transmitting motion between the members and the fixed element and for constraining the motion of the members with respect to each other and with respect to the fixed element so that one of the members is automatically positioned with respect to the fixed element at $$cot^{-1}x$$

of an equation having as the "$a$" terms thereof the values of the dimensions of the relative positions of the fixed element and the members for the positions at which the members are set with respect to the fixed element.

25. In apparatus for use in solving algebraic equations of the general form $$x^3+ax+b=0$$

a fixed element, a relatively movable element, and means for use in setting dimensions for representing any given values of the "$a$" and "$b$" terms within predetermined limits and for so controlling the relative positioning of said elements for any such setting of dimensions, that the position of the relatively movable element with reference to the fixed element represents a value of $x$ of an equation having as the "$a$" and "$b$" terms thereof the values for which dimensions are set.

26. In apparatus for use in solving algebraic equations of the form $$a_0x^n+a_1x^{n-1}+a_2x^{n-2}+ \ldots +a_n=0$$

a series of adjustable right triangular figures, each of said figures having two sides comprised of elements for representing the sides of any of a series of right triangles and a hypotenuse comprised of hypotenuse-representing means for representing the hypotenuse of any of a series of right triangles, means for maintaining the figures similar, said series of adjustable right triangular figures comprising $n$ such figures and including a first figure having a side for representing $a_0$, means for representing a dimension along and from one extremity of the corresponding side of each of the rest of the figures and for maintaining each such dimension equal to the length of the side opposite the corresponding side of the preceding figure, each of the sides aforementioned as the corresponding side of each of the rest of the figures being adapted to be adjusted for making the distance between the other extremity thereof and the nearest extremity of the aforementioned dimension represent a respective one of the rest of the "$a$" terms after $a_0$ and except $a_n$, the last figure having the opposite side for representing $a_n$; whereby, for any adjustment of the figures, the position of the hypotenuse of the first figure with reference to the side for representing $a_0$, and of the hypotenuse of each of the rest of the figures with reference to the corresponding side thereof, represents $$tan^{-1}x$$

of an equation having as values of $a_0$ and $a_n$ the lengths of the sides that represent the same and as values of the rest of the "$a$" terms the lengths of the distances that represent the same.

NEAL GARRETT.

Certificate of Correction

Patent No. 2,210,939.  August 13, 1940.

NEAL GARRETT

It is hereby certified that errors appear in the printed specification of the above numbered patent requiring correction as follows: Page 2, second column, line 16, for "he" read *the*; page 3, second column, line 40, for "227" read *227'*; page 4, first column, line 69, for "x (x+a)" read *x, (x+a)*; line 70, for "$\sqrt{-b}$" read *$\sqrt{-b}$*; page 8, first column, line 40, for "21 and 22" read *13 and 14*; page 9, second column, line 66, for the equation "$\sqrt{x^2+y^2}=c_1$" read *$\sqrt{x^2+y^2}=c_1$*; page 13, first column, line 69, claim 16, for the word "mounting" read *mountings*; page 14, first column, line 9, claim 21, for "element" second occurrence, read *thereof*; and that the said Letters Patent should be read with these corrections therein that the same may conform to the record of the case in the Patent Office.

Signed and sealed this 29th day of October, A. D. 1940.

[SEAL]

HENRY VAN ARSDALE,

*Acting Commissioner of Patents.*